H. W. PICCOT.
SIGN LETTER.
APPLICATION FILED MAR. 29, 1909.
953,101.
Patented Mar. 29, 1910.
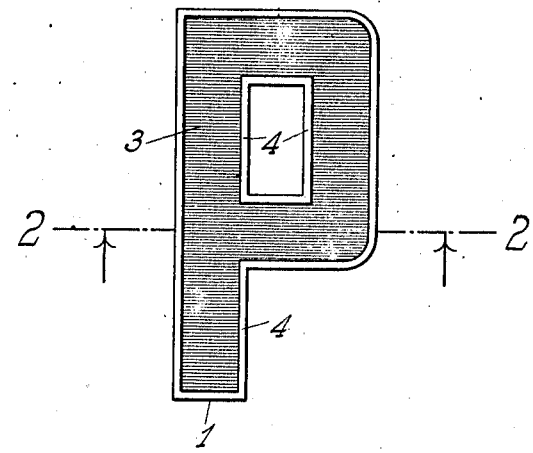
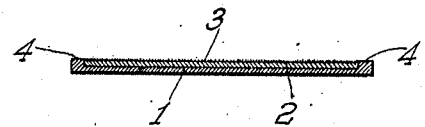
WITNESSES:
INVENTOR:
Henry W. Piccot.
BY
ATTORNEY

UNITED STATES PATENT OFFICE.

HENRY W. PICCOT, OF SCARSDALE, NEW YORK, ASSIGNOR TO RADIO SIGN COMPANY, A CORPORATION OF NEW YORK.

SIGN-LETTER.

953,101. Specification of Letters Patent. Patented Mar. 29, 1910.

Application filed March 29, 1909. Serial No. 486,529.

*To all whom it may concern:*

Be it known that I, HENRY W. PICCOT, a citizen of the United States, residing in Scarsdale, county of Westchester, and State of New York, have invented a new and useful Improvement in Sign-Letters, of which the following is a description.

This invention relates to advertising media, and particularly to sign-letters which may be used in various ways, as, for example, on inside and outside doors, on windows and on outdoor signs.

Objects of my invention are: to produce a simple, cheap and ornamental sign-letter, which can be quickly applied to a given surface either face-on or back-on; to provide a light, flexible sign-letter which can be packed in large numbers in small compass.

With the above objects in view, and others which will be disclosed during the course of this description, my invention consists in the features, elements and combinations hereinafter described and claimed.

In the drawings forming part of this specification: Figure 1 is a plan view showing a sign-letter embodying and illustrating my invention; and Fig. 2 is a section on the line 2—2 of Fig. 1, the figure being very much enlarged and certain features accentuated.

In producing the advertising mediums, or a sign-letter for example, certain essential steps are performed, as follows: Primarily, a foundation material 1, is provided which is light, flexible,—or which can be made flexible,—and capable of being rendered glutinous or tacky by the application of heat, moisture or both. Preferably, sheet-glue is employed for the foundation material, the surface of which, as the next step, may be rendered tacky along certain predetermined lines, in the form of any given character, by the application of heat, or moisture, or both, as may be required by the material used; or an adhesive substance or glue may be applied along the predetermined lines of the desired character. This may be done by a brush, stamp, die, stencil or other means capable of producing the desired result or effect. When this step is performed, the surface of the foundation material is usually somewhat depressed along the lines of the said character, especially if the adhesive substance is applied, or the surface of the foundation material is rendered tacky, by a stamp or die as stated, as shown in Fig. 2, where, also, the adhesive surface or material is indicated by 2. This view shows this feature of my invention purposely magnified in order that the same may be readily understood. The next step is to apply, to the adhesive surface produced, the foil, leaf, granular, or powdered substance, which can be applied by a brush, sprinkled or blown on according to the material, this substance being indicated in the drawings at 3. Whatever the substance, the surface of the article will be rendered ornamental thereby and can be beautified and made very showy according to the material or substance employed. The substance 3, thus applied, is allowed to dry, or, to facilitate this operation, the surface may be dried by blowing air thereon. The next step is to cut from the material the particular character impressed or outlined thereon, and this may be done by a die or shears. In cutting out the character, care should be taken to leave a marginal space or line of the foundation material, as indicated at 4, around the character so as to enable the character to be applied face-on, if desired. If the character have an opening or openings therein, as shown in the drawings, the marginal line or space 4 will also be left around the same. This space or line becomes ornamental, as well as useful, will be readily understood. The entire surface is "cleaned up" with a soft brush or cloth, so as to leave the character clean and clearly outlined.

The character produced according to the foregoing method or process can be applied, by its back, to any surface,—smooth or rough,—by soaking the same in water for a sufficient period to bring out its adhesive quality and this without affecting, in any manner, the ornamental surface, which, by application of the leaf, foil, or granular substance, becomes substantially waterproof or impervious to moisture. By reason of the facial outlines 4 of the character, due to leaving the sufficient margin as before described, the same can be applied face-on by thus moistening the same.

Different effects can be obtained by using opaque, transparent or translucent foundation materials; by cutting the character from the foundation material so as to have a narrow or wide uniform or non-uniform outline or border beyond the ornamental material applied for outline of the character; and by cutting the material around the character in irregular manner, light and shade effects can be produced.

In producing certain features of the article, a stencil may be employed and laid on the foundation material, and leaf or powdered substance applied to the foundation material through the openings in the stencil, the surface of the foundation material having been rendered adhesive according to the method already outlined. After thus using the stencil, the character will be cut out as described so as to leave a margin all around the character, if desired, or only in such places as to produce the light and shade effects. The character may be cut out without leaving the margin or border, in which case the character can be applied only by its back, as previously described.

The article or advertising mediums thus produced has, essentially, the characteristics and consists essentially of the materials as follows: (1) a foundation material which can be rendered adhesive or tacky for two purposes, viz., to apply it either back-on or face-on and to enable another substance to be applied thereto; (2) the surface, in the outline of the predetermined character, of the foundation material is somewhat depressed; (3) on this depressed portion the ornamental material is imposed; and (4) the character is cut out or produced in a given outline leaving around its openings or spaces and around its figure, an outline of the foundation material beyond the material or substance imposed thereon, thus rendering the article or mediums capable of being applied face-on, if desired, and at the same time giving character and an ornamental appearance to the mediums or device.

In viewing Fig. 2, it will be seen, on a more magnified scale, that the foundation material is not depressed around its marginal lines 4 and that, when the adhesive substance is applied and the ornamental substance is imposed thereon, the combined materials become substantially flush with the surface of the said outlines 4, thus making it possible to apply the character or mediums face-on without wrinkling or bulging the same, as will be readily understood.

Having thus described my invention, what I claim and desire to secure by Letters Patent is:

1. An advertising device comprising a flexible foundation material composed of a substance which can be rendered adhesive, said material having a character of ornamental material secured thereto so as to leave a border of the foundation material all around, whereby the device can be applied to a given surface either face-on or back-on.

2. An advertising device comprising a flexible foundation material composed of a substance which can be rendered adhesive, said material having a character of ornamental material impressed upon its surface and fixed thereto by adhesive substance, the said character being substantially flush with the surface of said material, substantially as described.

In testimony whereof I have hereunto signed my name in the presence of two subscribing witnesses.

HENRY W. PICCOT.

Witnesses:
   CHAS. McC. CHAPMAN,
   M. HERSKOVITZ.